US008997773B2

(12) United States Patent
Kotefski et al.

(10) Patent No.: US 8,997,773 B2
(45) Date of Patent: Apr. 7, 2015

(54) PRESSURE DISCHARGE MECHANISM FOR CLOSED VESSELS

(71) Applicants: Stojan Kotefski, Bloomingdale, NJ (US); Cathleen Reda, West Milford, NJ (US)

(72) Inventors: Stojan Kotefski, Bloomingdale, NJ (US); Eugene R Reda, West Milford, NJ (US)

( * ) Notice: Subject to any disclaimer, the term of this patent is extended or adjusted under 35 U.S.C. 154(b) by 97 days.

(21) Appl. No.: 13/623,843

(22) Filed: Sep. 20, 2012

(65) Prior Publication Data

US 2015/0000546 A1    Jan. 1, 2015

Related U.S. Application Data

(63) Continuation-in-part of application No. 13/107,486, filed on May 13, 2011, now Pat. No. 8,596,290.

(51) Int. Cl.
| | |
|---|---|
| *F16K 17/14* | (2006.01) |
| *F16K 17/00* | (2006.01) |
| *B65D 51/16* | (2006.01) |
| *F42B 27/00* | (2006.01) |
| *F42B 39/14* | (2006.01) |
| *F42B 39/20* | (2006.01) |

(52) U.S. Cl.
CPC .......... *F16K 17/003* (2013.01); *B65D 51/1633* (2013.01); *F42B 27/00* (2013.01); *F42B 39/14* (2013.01); *F42B 39/20* (2013.01)

(58) Field of Classification Search
CPC ........ B65D 90/32; B65D 90/34; F42B 39/14; F16K 17/003
USPC .......................... 137/72, 74, 73; 220/89.4, 89
See application file for complete search history.

(56) References Cited

U.S. PATENT DOCUMENTS

| | | | | |
|---|---|---|---|---|
| 3,032,311 | A * | 5/1962 | Brinkman | 251/351 |
| 4,733,872 | A * | 3/1988 | Sugimura | 411/82 |
| 4,744,382 | A * | 5/1988 | Visnic et al. | 137/68.23 |
| 5,240,027 | A * | 8/1993 | Vertanen | 137/73 |
| 5,398,498 | A | 3/1995 | Mort et al. | |
| 6,752,085 | B2 | 6/2004 | Roach | |
| 7,451,703 | B1 * | 11/2008 | Dabiri | 102/481 |
| 8,596,290 | B2 * | 12/2013 | Kotefski et al. | 137/72 |

* cited by examiner

*Primary Examiner* — Kevin Lee
*Assistant Examiner* — P. Macade Nichols
(74) *Attorney, Agent, or Firm* — Scully, Scott, Murphy & Presser, P.C.

(57) ABSTRACT

The present invention relates in general to a pressure discharge mechanism for closed vessels having an internal chamber designed to hold volatile and/or explosive substances in a sealed manner comprised of an at least one eutectic composition and a threaded joint designed to open or vent the closed vessel when the contents of the closed vessel reaches a predetermined temperature while maintaining full structural integrity during normal operation. In one aspect, the closed vessel is a munitions casing which functions as intended under normal operating environments, but then when exposed to extreme temperatures, reduces the munition's high order explosion capability, and is transformed into a safe, low order reaction with significantly less reactive potential. In one aspect, the closed vessel is a transport tanker which should not release substances contained therein. However, if the tanker catches fire, the pressure relief mechanism of the present invention reduces risk of explosion.

25 Claims, 4 Drawing Sheets

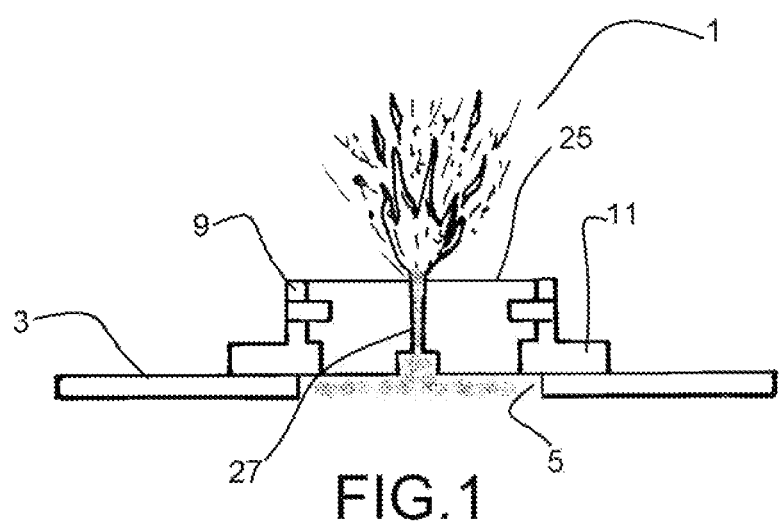
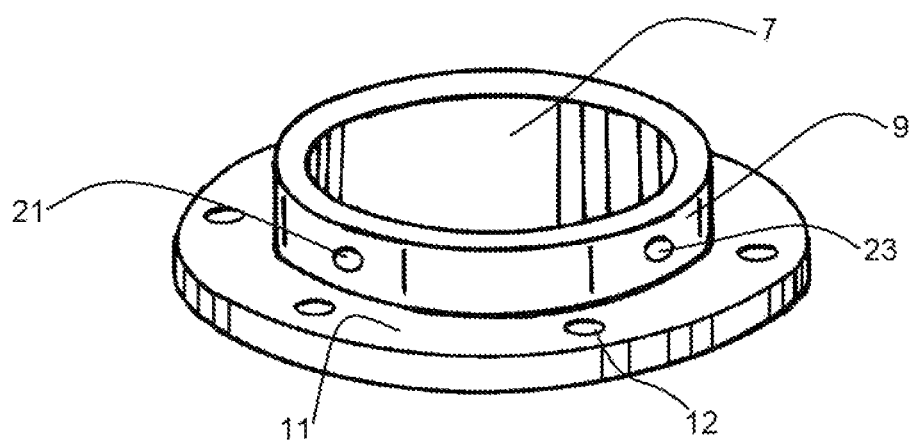

PRESSURE DISCHARGE MECHANISM FOR CLOSED VESSELS

This application is a continuation in part of U.S. patent application Ser. No. 13/107,486, filed May 13, 2011.

This invention was made with government support. The Government of the United States has certain rights in the invention.

FIELD OF THE INVENTION

The present invention relates in general to a threaded joint having a eutectic solder seal that when sufficiently heated acts as a pressure discharge mechanism for closed vessels having an internal chamber designed to hold volatile and/or explosive substances in a sealed manner. More particularly, a pressure discharge mechanism comprised of an at least one eutectic composition designed to open or vent the closed vessel when the contents of the closed vessel reaches a predetermined temperature is described. It is an object of the present invention that the closed vessel remain with full strength integrity under pressure when operating under normal parameters and the pressure relief is only activated under specific circumstances. In one aspect, the closed vessel is a munitions casing, including casings for grenades, bomblets and artillery shells. The munitions utilizing the closed vessel of the present invention functions as intended under normal operating environments. However, when the munitions utilizing the closed vessel of the present invention are exposed to extreme temperatures, such as during accident conditions during storage or transport, or during planned demilitarization operations, the pressure discharge mechanism reduces the munition's high order explosion capability, into a safe, low order reaction with significantly less reactive potential. In one aspect, the closed vessel is a transport tanker, including a gasoline tanker, propane tanker, and the like. Under normal conditions, the tankers should not release substances contained therein, such as, gasoline, propane and the like into the environment. However, if the tanker transport catches fire, a high order, violent explosion is a potential result. The pressure relief mechanism of the present invention reduces such risk.

BACKGROUND

Hazardous materials, such as, for example, explosive materials, flammable materials, bio-hazardous materials, other types of materials that have a flash point, detonation or volatile ignition temperature that makes them hazardous, and in some cases, particularly chosen and developed for their hazardous properties, in for example, munitions applications, and the like, require safe storage, handling and disposal. Such materials are frequently stored and/or utilized in closed vessels. The closed vessels create challenges for the safe removal of the hazardous material, such as, for example, removing explosive material from munitions, and safe handling, such as, for transportation of munitions prior to desired deployment. The closed vessels also create challenges when the temperature of the closed vessel rises beyond the safe operating and handling temperature of the vessel.

Conventional pressure relief valves typically vent the contents of a closed vessel when the pressure in the vessel reaches a critical condition. However, conventional pressure relief valves do not provide a warning as to when a vessel is in a critical and an unsafe state.

Moreover, conventional pressure relief mechanisms may reduce the structural integrity of the closed vessel overall reducing the closed vessel capability to perform to its fullest potential under normal operating conditions.

In general, closed vessels have normal handling and operating temperatures between 60° F. to 160° F. In case of a fire, or other cause of extreme heat, the temperature of the closed vessel rises beyond a safe temperature of, for example, 160° F., the material contained inside the closed vessel expands and creates an increased internal pressure (hoop pressure). At a certain point, as the internal pressure increases, the closed vessel ruptures and creates a high order explosion. If this hoop pressure were to be relieved, the high order explosion can be reduced to a low order reaction. A low order reaction still has a flame and fire associated with it, but it does not explode. By eliminating the high order explosion, the hazardous material can be safely dealt with.

Safety is another important design aspect of transport and storage of volatile materials, as well as munitions, including, for example, artillery shells, bomblets, rockets, mortars, missiles, hand grenades and the like. For example, the propellants and explosives contained within munitions degrade over time, and thus their reliability decreases to an unacceptable level, resulting in munitions having a limited "shelf life". When the shelf life of a given munition is reached, it is withdrawn from stock and replaced with a new munition. This results in a problem in that these withdrawn, but still "live" munitions with dangerous high energy explosives ("energetics") and other hazardous materials, such as lead, must be "demilitarized," i.e. rendered to a state where they are no longer capable of being used as a munition or otherwise causing a safety threat. In order to accomplish this, the energetics must be removed from the munition and disposed of safely. Demilitarization procedures frequently involve the intentional burning of the munition.

Consequently, munitions need to be rendered "safe" instead of going high order when exposed to high temperatures, either from, for example, an intentional or accidental fire. Typically, however, munitions are not provided with a "safe" mode for exposure to high temperatures. As a result, the risk of a high order detonation is significant.

Heat exposure may be a rapid exposure to high temperatures (a fast cook off condition), or a slow, sustained exposure (a slow cook off event), either exposures can result in a high order detonation.

A non-functional ("safe") mode is desirable so that firefighting efforts or demilitarizing procedures can be performed without the risk of a high order detonation from a single munition, or multiple munitions that may be packaged in a container such as in ammunition cans, pallets, and/or at an ammunition depot.

The design of munitions casings does not typically allow for the separation of the body after assembly. For example, the fragmentation body of a hand grenade is usually made of a cast iron member or a stamped metal with an embossed fragmentation pattern. The grenade body is made up of two pieces that are resistance welded, generally, along the diametric center of the body, thus creating a single piece body that functions as a pressure vessel for the energetics contained therein.

As a result of the detonation of the energetics, the munition is broken up and the fragments or the metal particles embedded in the body are scattered, causing damage to the surrounding environment. Such damage could be significant and in many cases unavoidable. For instance, if the munition were stored in a warehouse, a cook-off condition, whether slow or fast, would cause a chain reaction explosion or sympathetic detonation within the warehouse.

It is therefore an object of the present invention to provide a pressure discharge mechanism for closed vessels containing hazardous materials which automatically opens and/or vents said materials before the temperature and/or pressure in the vessel causes the vessel to rupture, and/or resulting in a high order detonation.

It is another object of the present invention to provide a pressure discharge mechanism that minimizes and/or eliminates high order detonations of closed vessels.

It is still another object of the present invention to provide a pressure discharge mechanism for closed vessels that provides a signal of an unsafe condition within the closed vessel to persons, such as, for example, fire fighters. It is yet another object of the present invention to provide a pressure discharge mechanism which will warn persons that the closed vessel has reached a critical condition, and that rupture and/or detonation thereof may be imminent. Prior to the advent of the present invention, the need for such a pressure discharge mechanism has heretofore remained unsatisfied.

It is yet another object of the present invention to provide a munition design that overcomes the afore mentioned problems associated with conventional munitions, and yet still functions normally under normal environmental conditions, with minimal manufacturing variances, in order to maintain the same user directions and training as for existing munitions, and to allow the use of conventional manufacturing procedures with minimal changes to the assembly lines. Prior to the advent of the present invention, the need for such a pressure discharge mechanism has heretofore remained unsatisfied.

For example, U.S. Pat. No. 6,752,085 provides an apparatus for releasably attaching a closure plate to an open end of a cylindrical casing, the apparatus having an inner member; a threaded outer ring biased in tension, disposed adjacent to the inner member, for releasably engaging an interior wall of the casing; and a eutectic spacer between the inner member and the outer ring. At temperatures below the melting point of the eutectic spacer, the outer ring is held in threaded engagement with the casing, and holds the closure plate in position in abutment with the casing. When the temperature of the eutectic spacer reaches its melting temperature, the eutectic spacer transitions to a liquid state, flows away from the apparatus, allowing the outer ring to retract into a groove in the inner member, and the closure to be released from the casing.

In another example, U.S. Pat. No. 5,398,498 provides a joint construction [that] is employed between a military rocket motor and a warhead adapted to be propelled be the motor. The motor includes a motor tube with a cylindrical front portion having an internal cylindrical surface therein. The warhead comprises an adapter ring having a cylindrical rear portion with an external cylindrical surface which is telescopically receivable within the internal cylindrical surface. The internal and external cylindrical surfaces are formed with respective confronting aligned internal and external helical screw thread grooves for receiving a fusible substantially helical joint member to form a secure connection between the rocket motor and the warhead. The helical joint member is made of a material having a low melting temperature, preferably a eutectic metal alloy, whereby the heat of a fire or the like will melt the joint member to disconnect the warhead from the rocket motor. The motor tube has a front wall with a vent operating therein, normally closed by a plug member. The adapter ring includes a means for retaining the plug member in the vent opening. The melting of the fusible joint member is effective to release the retaining action of the adapter ring, whereby any pressure in the motor tube expels the plug member and the adapter ring from the motor tube.

SUMMARY

After considerable investigation and research, the pressure discharge mechanism of the present invention was unexpectedly discovered. In particular, a pressure discharge mechanism for closed vessels containing volatile and/or explosive substances was unexpectedly discovered which automatically opens and vents said substances before the temperature and/or pressure in the closed vessel causes the vessel to rupture, and which may otherwise cause a high order detonation.

Additionally, the pressure discharge mechanism of the present invention may also signal firefighters of an unsafe condition in the closed vessel which could cause injury and/or death to firefighters/first responders. This signal, which precedes the automatic opening of the pressure discharge mechanism, also warns the firefighters that the substances contained within the closed vessel have reached a critical condition and that rupture and/or detonation may be imminent.

In one embodiment, the present invention provides a pressure discharge mechanism for closed vessels comprising:
 a. a valve body having an at least one through hole therein adapted to mate and communicate with a corresponding through hole in a wall of a closed vessel; and
 b. an at least one vent which automatically provides a release of the closed vessel contents through the at least one through hole in the valve body when the contents therein reach a predetermined temperature lower than the critical combustion and/or explosive temperatures of the contents in the closed vessel.

In one embodiment, the present invention provides a pressure discharge mechanism for closed vessels comprising:
 a. a valve body having an at least one through hole therein adapted to mate and communicate with a corresponding through hole in a wall of a closed vessel;
 b. an at least one first vent which automatically provides a partial release of closed vessel contents at a first predetermined temperature lower than critical combustion and/or explosive temperatures of the contents in the closed vessel; and
 c. an at least one second vent which automatically provides a second and greater release of the closed vessel contents through the at least one through hole in the valve body when the contents therein reach a second predetermined temperature higher than the first predetermined temperature but still lower than the critical combustion and/or explosive temperatures of the contents in the closed vessel.

In an alternate embodiment, the present invention provides a temperature safe munition primarily for use in military applications, but not limited thereto, with potential applications in civilian commercial and aerospace applications. In particular, the present temperature safe munition functions as intended under normal operating environments. However, when the munition is exposed to extreme temperatures it reduces its high order explosion capability, and is transformed into a safe, low order reaction with significantly less reactive potential.

In one embodiment, the present invention provides a temperature safe munition comprising two members that are secured together by a threaded joint sealed with a eutectic solder, thereby forming a closed vessel with full structural integrity. The threaded joint allows for the separation of the two members when the munition is exposed to a temperature at or in excess of a predetermined critical temperature whereby the eutectic solder melts and acts as a lubricant allowing the threaded joint to unscrew.

BRIEF DESCRIPTION OF THE DRAWINGS

The above and other features of the present invention and the manner of attaining them, will become apparent and the invention itself will be best understood, by reference to the following description and the accompanying drawings, wherein:

FIG. 1 is a partial cross-sectional view of a wall of a closed vessel (3) having one embodiment of the pressure discharge mechanism of the present invention (1) mounted thereon and, particularly illustrating, a small stream of substances contained within the closed vessel issuing from the small vent hole (27) to provide a signal and warning to firefighters of an approaching critical temperature of the substances contained within the closed vessel.

FIG. 2 is a perspective view of a flanged valve body used in one embodiment of the pressure discharge mechanism of the present invention, illustrating holes (12) in the flange (11) used to affix the valve to a wall of the closed vessel, and holes (21, 23) through the side of the valve body (9) into which anti-rotation pins can be inserted to prevent rotation of a plug closing the valve.

DETAILED DESCRIPTION

Figure 3:
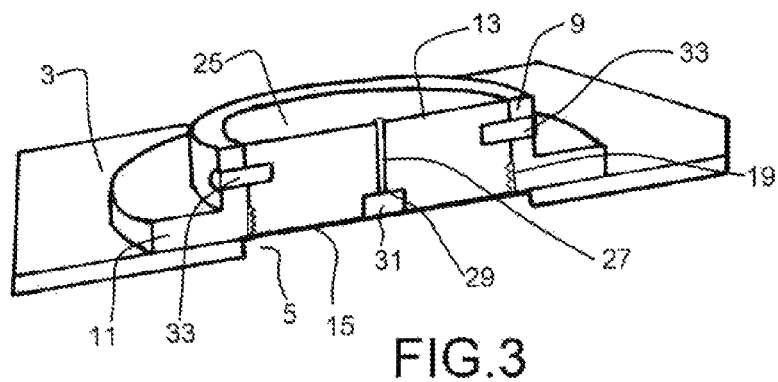
FIG. 3 is a perspective view of the cross-section of one embodiment of the pressure discharge mechanism of the present invention shown in FIG. 1, particularly illustrating the plug (25) held and in threaded engagement with the valve body (9, 11), and the holes extending through the side of the valve body (9) and into the plug into which can be inserted anti-rotation pins (33).

For clarity of disclosure, and not by way of limitation, the detailed description of the invention is divided into the following subsections that describe or illustrate certain features, embodiments or applications of the present invention.

DEFINITIONS

"Closed vessel" as used herein refers to any vessel having an internal chamber designed to hold volatile and/or explosive substances in a sealed manner, including, for example: storage tanks, munitions casings (including grenade, shell), ammunition storage containers (also known as an ammunition can), fuel tankers and the like.

"Hazardous material" as used herein refers to any volatile or explosive substance that has a flash point, detonation or volatile ignition temperature that makes them hazardous, including, for example: explosives, fuels and the like.

"Energetics" or "Energetic material" as used herein refers to an explosive material, such as, for example, the melt-pour explosive known as Composition B.

LIST OF DRAWING ELEMENTS

1: pressure discharge mechanism
3: wall of a closed vessel for flammable or explosive fuels
5: hole in closed vessel wall (3)
7: bore hole
9: valve body
11: flange
12: hole through flange (11)
13: larger diameter of bore hole (7) through valve body (9)
15: lower or entry end of bore hole (7)
17: shoulder
19: threads (formed on an inner surface of the smaller diameter bore hole (15)), forming a thread joint
21, 23: small bore holes
25: plug
27: small vent hole
29: lower end of small vent hole (27)
31: small vent plug or pin eutectic
33: anti-rotation eutectic plugs or pins
35: eutectic material
41A and 41B: two members of munition casing
42: internal chamber of munition casing
43: fuse hole of munition casing
44: threaded joint of one half of munition casing
45: mating threaded joint of other half of munition casing

THE PRESSURE DISCHARGE MECHANISM OF THE PRESENT INVENTION

In one embodiment, the present invention provides a pressure discharge mechanism for closed vessels comprising:
  a. a valve body having an at least one through hole therein adapted to mate and communicate with a corresponding through hole in a wall of a closed vessel; and
  b. an at least one vent which automatically provides a release of the closed vessel contents through the at least one through hole in the valve body when the contents therein reach a predetermined temperature lower than the critical combustion and/or explosive temperatures of the contents in the closed vessel.

In an alternate embodiment, the present invention provides a pressure discharge mechanism for closed vessels comprising:

a. a valve body having an at least one through hole therein adapted to mate and communicate with a corresponding through hole in a wall of a closed vessel;

b. an at least one first vent which automatically provides a partial release of closed vessel contents at a first predetermined temperature lower than critical combustion and/or explosive temperatures of the contents in the closed vessel; and c. an at least one second vent which automatically provides a second and greater release of the closed vessel contents through the at least one through hole in the valve body when the contents therein reach a second predetermined temperature higher than the first predetermined temperature but still lower than the critical combustion and/or explosive temperatures of the contents in the closed vessel.

The pressure discharge mechanism of the above embodiment is shown generally at (1) in FIG. 1, mounted on wall (3) of a closed vessel containing hazardous substances (not shown). A hole (5) in the closed vessel wall (3) communicates with a bore hole (7) (FIGS. 2 and 5) formed in body (9) of valve (1) (FIGS. 1, 2, 6, and 7). A flange (11) is shown connected to or formed integral with valve body (9) (FIGS. 1-7), the purpose of flange (11) being to facilitate the mounting of valve (1) on wall (3) of the closed vessel. Holes (12) through flange (11) can be used in mounting valve (1) (FIGS. 2-4) to the wall of the closed vessel (3).

The pressure discharge mechanism of the present invention may be modified to fit and be suitable for any closed vessel. Closed vessels include, for example, fuel containers, ammunition cans or containers, tanker trucks, munitions casings and the like. The pressure discharge mechanism of the present invention may be modified to be suitable for the substance contained within the closed vessel and/or closed vessels contained within closed vessels. A person of ordinary skill in the art can readily appreciate and make the modifications, based on factors such as, for example, the shape and size of the closed vessel, the flash point and/or detonation temperature of the substance within the closed vessel, the physical properties of the substance contained within the closed vessel, including, but not limited to density, viscosity, or phase, the nature of any required warning, and the like. One, or more than one of the individual aspects of the pressure discharge mechanism may be modified. More than one pressure discharge mechanism may deployed.

For example, but not intending to limit the invention, the valve body (9) may be modified. Alternatively, the at least one first vent may be modified. Alternatively, the at least one second vent may be modified. Alternatively, the flange (11) may be modified. Alternatively, the hole (5) may be modified. Alternatively, the bore hole (7) may be modified.

In one embodiment, the bore hole (7) through valve body (9) has a larger diameter (13) at an outer or discharge end than at a lower or entry end (15) which is in contact with the closed vessel (see FIGS. 3-7). As shown in FIGS. 3-7, a shoulder (17) is formed on an inner surface of bore hole (7) where the bore hole changes diameter. Threads (19) are formed on an inner surface of the smaller diameter bore hole (15) in valve body (9) (FIGS. 3-7). Small bore holes (21, 23) are drilled or otherwise formed in a wall of valve body (9) (FIGS. 2-5) and into plug (2)5 (FIGS. 1, 3-5, and 7).

Plug (25), which may be formed of a metal or other material having sufficient strength and chemical resistance to operate in the operating environment, has a small vent hole (27) extending through the plug (25), and small vent hole (27) is enlarged at its lower end (29) closest to the substances contained within the closed vessel (see FIGS. 1 and 3-5).

In one embodiment, a plug (31) fits in sealing engagement with walls of the lower end (29) of vent hole (27) (see FIGS. 1-5). Plug (31) may be formed from any suitable material that is capable of opening small vent hole (27) in the event of a pre-determined condition, such as an extreme temperature within the storage vessel. In one embodiment, plug (31) is formed from a first eutectic composition. The first eutectic composition undergoes a phase change from solid to liquid at a first pre-determined temperature, thereby opening small vent hole (27). In one embodiment, the first eutectic composition is selected to undergo a phase change from solid to liquid when a first pre-determined temperature, corresponding to the within the closed vessel that is unsafe for the substances stored within the closed vessel.

There can be one, or at least one small vent hole (27) in the pressure discharge mechanism of the present invention. There can be one, or at least one plug (31) in the pressure discharge mechanism of the present invention.

In certain embodiments, the one, or at least one small vent hole (27) provides a hole whereby the substances contained within the closed vessel may escape. The dimensions of the one, or at least one small vent hole (27) can be altered, such that the amount of, or the rate at which the substances escape is controlled. In one embodiment, the amount of, or the rate at which the substances escape is sufficient to serve as a visual warning that the temperature of the substances contained within the closed vessel are at a first pre-determined temperature. In one embodiment, the one, or at least one small vent hole (27) opens, permitting the substances to escape, thereby serving as a visual warning by one, or at least one plug (31) undergoing a phase change from solid to liquid at a first predetermined temperature.

In one embodiment, there is a solder material (35) located adjacent the thread joint (15,19; and/or 44,45) that is used to seal the thread joint from fluid or material flow under normal operating conditions, and/or strengthens the mechanical strength of the anti-rotation capability of the thread joint (15,19; and/or 44,45) under normal operating conditions. The solder material may be formed from any material that is suitable for sealing and/or strengthening the thread joint. In one embodiment, the solder material (35) is formed from a second eutectic composition.

In one embodiment, the second eutectic solder composition undergoes a phase change from solid to liquid at a second pre-determined temperature. In one embodiment, the second pre-determined temperature is greater than the first pre-determined temperature and less than a third pre-determined temperature.

In one embodiment, the first pre-determined temperature is about 200° F.

In one embodiment, the second pre-determined temperature is about 250° F.

In one embodiment, the third pre-determined temperature is about 280° F.

In one embodiment, the phase change of the second eutectic composition from solid to liquid serves as a lubricant for the threaded joint, when the anti-rotation pins (21) phase change or melt.

Figure 4:
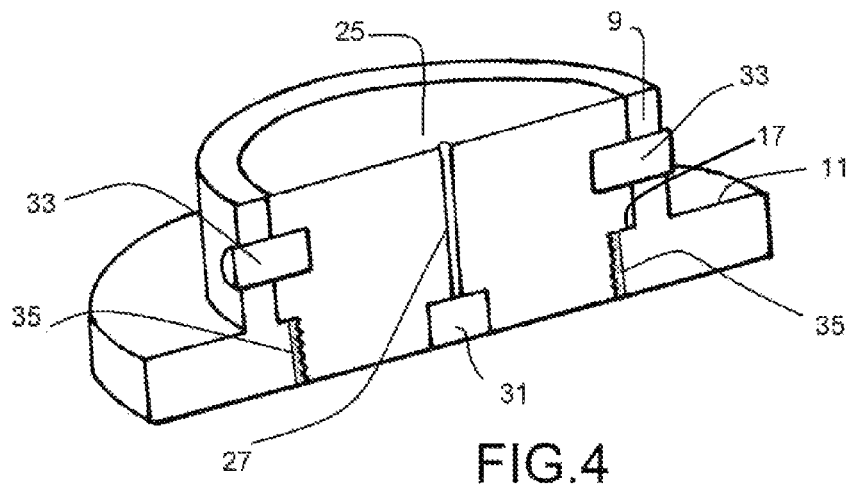
FIG. 4 is a cross-sectional perspective view of one embodiment of the pressure discharge mechanism of the present invention, illustrating the holes or recesses into which plugs or pins (33) can be inserted, as well as the threaded engagement (35) of the valve body (9, 11) with the plug (25) through which a small quantity of the substances contained within the closed vessel is automatically released to signal and warn firefighters of imminent danger when the small plug (27, 31) melts and forms an opening in the plug (25).
Figure 5:
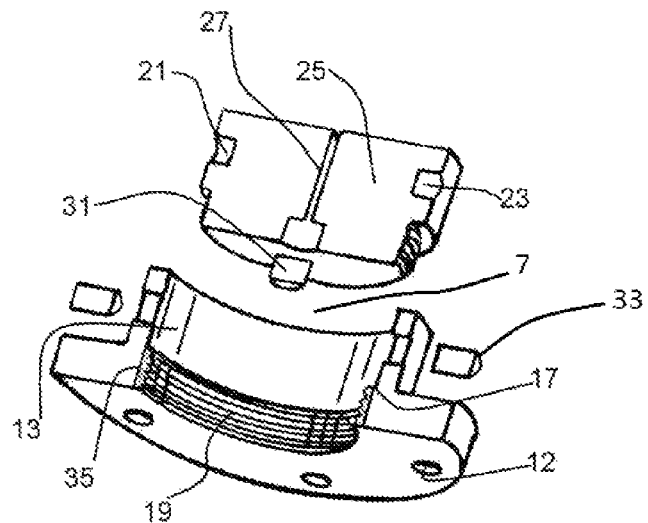
FIG. 5 is an exploded perspective view of the components of one embodiment of the pressure discharge mechanism of the present invention, particularly illustrating the pins or plugs (31, 33) used for closing both the valve warning system and the main discharge system for the valve, as well as the solder material (35).
Figure 6:
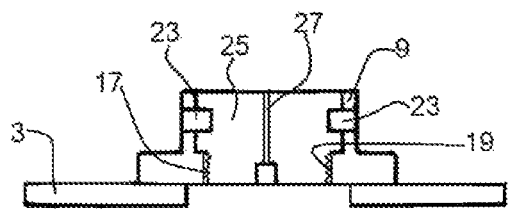
FIG. 6 is a cross-sectional view of a closed vessel (3) with one embodiment of the pressure discharge mechanism of the present invention mounted thereon, illustrating the position of components of the valve when the valve is in a closed position.
Figure 7:
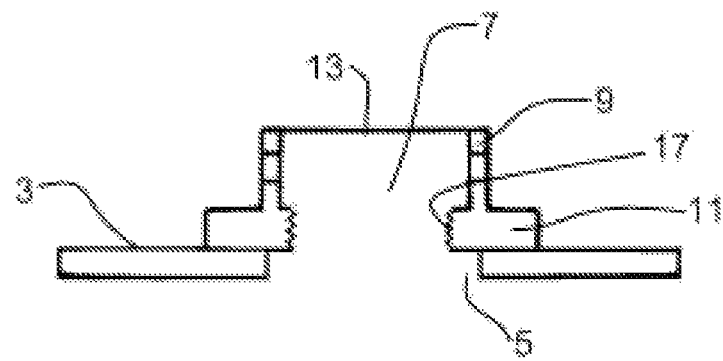
FIG. 7 is a cross-sectional view of a closed vessel (3) with one embodiment of the pressure discharge mechanism of the present invention mounted thereon, illustrating the position of the valve components when the valve is open.

In another embodiment, such as, for example, in the embodiment shown in FIGS. 4 and 5, anti-rotation plugs or pins (33) may be inserted in sealing engagement with surfaces of bore holes (21, 23) to prevent plug (25) from rotating outwardly from the valve body (9), and thereby opening valve (1). The anti-rotation plugs or pins (33) may be formed from any suitable material that is capable of allowing plug (25) to rotate outwardly in the event of a pre-determined condition, such as an extreme temperature within the storage vessel. In one embodiment, the anti-rotation plugs or pins (33) may be formed from a third eutectic composition. The third eutectic composition undergoes a phase change from solid to liquid at a third pre-determined temperature, thereby allowing plug (25) to rotate outwardly. In one embodiment, the third eutectic composition is selected to undergo a phase change from solid to liquid when the temperature within the closed vessel is at a third predetermined level, such as, for example, at a temperature that is unsafe for the substances stored within the closed vessel.

In one embodiment, the third pre-determined temperature is higher than the first or second pre-determined temperatures. In this embodiment, the plug (31) would undergo a phase change from solid to liquid before the anti-rotation plugs or pins (33).

In one embodiment, the third eutectic composition undergoes a phase change from solid to liquid at a higher temperature than the first or second eutectic composition. In this embodiment, the plug (31) would undergo a phase change from solid to liquid before the anti-rotation plugs or pins (33).

The Pressure Discharge Mechanism of the Present Invention Employed in Storage Vessels As discussed above, the pressure discharge mechanism of the present invention may be utilized on any closed vessel. However, for clarity and without limiting the disclosure in any way, the following section discusses the application of the pressure discharge mechanism of the present invention on fuel storage tanks.

Accordingly, in a first preferred embodiment, there is provided a pressure discharge mechanism for storage tanks comprising:
 a. a valve body means having a through hole (vent hole) disposed therethrough, said valve body operable to mate and communicate with a through hole in a wall of the storage tank;
 b. a first vent means which automatically provides a partial release of storage tank liquid and/or gases at a first predetermined temperature lower than critical combustion and/or explosive temperatures of liquid in the storage tank, said first vent means providing a visual signal and warning to firefighters of hazardous conditions that rupture of the storage tank or explosion of liquid in the storage tank is imminent; and
 c. a second vent means operable to vent liquids in said storage tank through the hole in the valve body means when the liquids therein reach a predetermined critical temperature.

In a second preferred embodiment, there is provided in connection with the first preferred embodiment a pressure discharge mechanism in which a temperature differential between venting of the first vent means and the second vent means can be adjusted to provide a specific time/temperature interval to provide safer conditions for firefighters.

In a third preferred embodiment, there is provided in connection with the first preferred embodiment a pressure discharge mechanism in which a flange means is provided on the valve body means to aid in affixing the valve body means to the storage tank.

In a fourth preferred embodiment, there is provided in connection with the first preferred embodiment a pressure discharge mechanism which further comprises a plug means adapted to be connected in threaded engagement with the valve body means, whereby to close the through hole therein until the temperature of fluids in the storage tank reaches a critical predetermined temperature.

In a fifth preferred embodiment, there is provided in connection with the fourth preferred embodiment a pressure discharge mechanism in which the first vent means further comprises a vent hole in said plug means to facilitate a partial release of fluids from the storage tank to the atmosphere.

In a sixth preferred embodiment, there is provided in connection with the fifth preferred embodiment a pressure discharge mechanism in which the vent hole in the first vent means is provided with a plug formed of a vent eutectic which seals the vent hole until a first predetermined temperature is reached when it becomes necessary to warn firefighters of hazardous temperatures in the storage tank.

In a seventh preferred embodiment, there is provided in connection with the sixth preferred embodiment a pressure discharge mechanism in which said vent eutectic changes from a solid to a liquid over a predetermined temperature range, thereby melting the solid plug (vent eutectic) from the vent hole which results in a partial release of liquids from said first vent means.

In an eighth preferred embodiment, there is provided in connection with the seventh preferred embodiment a pressure discharge mechanism in which the vent eutectic is one or more selected from the group consisting of $Bi_{58}Pb_{42}$, $In_{52}Sn_{48}$, $In_{74}Cd_{26}$, and $In_{50}Sn_{50}$.

In a ninth preferred embodiment, there is provided in connection with the fourth preferred embodiment a pressure discharge mechanism in which the valve body means has a round through hole which has a smaller diameter in contact with the storage tank than at the discharge end of the pressure valve, and a shoulder formed where the diameter of the through hole becomes larger.

In a tenth preferred embodiment, there is provided in connection with the ninth preferred embodiment a pressure discharge mechanism in which the smaller discharge hole in the valve body means is threaded.

In an eleventh preferred embodiment, there is provided in connection with the tenth preferred embodiment a pressure discharge mechanism in which the plug means conforms in size and shape to the round through hole in the valve body means, and fits in sealing engagement therewith when in threaded engagement with the valve body means, and when a shoulder on the through hole of the valve body means is in sealing engagement with a corresponding shoulder formed on the plug means.

In a twelfth preferred embodiment, there is provided in connection with the ninth preferred embodiment a pressure discharge mechanism in which the second vent means further comprises a hole extending through the valve body means and into said plug means.

In a thirteenth preferred embodiment, there is provided in connection with the twelfth preferred embodiment a pressure discharge mechanism in which the second vent means further comprises an anti-rotational solid plug in the hole extending through the valve body means and into the plug means, said anti-rotational solid plug changes phase from solid to liquid when liquid in the storage tank reaches a predetermined critical temperature, at which time internal pressure in the storage tank causes the plug means to rotate until no longer in threaded engagement with the valve body means and forced out of the valve body means, thus fully opening the valve and relieving excess pressure in the storage tank.

In a fourteenth preferred embodiment, there is provided in connection with the thirteenth preferred embodiment a pressure discharge mechanism in which the solid anti-rotational plug is formed from one or more eutectic compositions selected from the group consisting of $Bi_{58}SN_{42}$, $Bi_{57}Sn_{42}Ag_1$, and $Sn_{51.2}Pb_{30.6}Cd_{18.2}$.

In a fifteenth preferred embodiment, there is provided a pressure discharge mechanism for storage tanks comprising:
a. a valve body means having a through hole therein adapted to mate and communicate with a through hole in a wall of the storage tank;
b. a first vent means which automatically provides a partial release of storage tank liquids at a first predetermined temperature lower than critical combustion and/or explosive temperatures of said liquids in the storage tank, providing a visual signal and warning to firefighters of hazardous conditions that rupture of the storage tank or explosion of liquid in the storage tank is imminent;
c. a second vent means which automatically vents liquid in said storage tank through the hole in the valve body means when the liquid in the storage tank reaches a predetermined critical temperature, and
d. a plug means adapted to be connected in threaded engagement with the valve body means, whereby to close the through hole therein until the temperature of fluid in the storage tank reaches a critical temperature, said first vent means further comprising a vent hole extending through said plug means to facilitate a partial release of fluids from the storage tank to the atmosphere, the vent hole in the first vent means being provided with a plug formed of a vent eutectic which seals the vent hole until a first predetermined temperature is reached when it becomes necessary to warn firefighters of hazardous temperatures in the storage tank, said vent eutectic changing from a solid to a liquid over a predetermined temperature range, thereby melting the solid plug and opening the vent hole which results in a partial release of liquids from said first vent means, said valve body means having a round through hole which has a smaller diameter in contact with the storage tank than at the discharge end of the pressure valve, with a shoulder being formed where the diameter of the through hole becomes larger, the smaller discharge hole in the valve body means being threaded, said plug means conforming in size and shape to the round through hole in the valve body means, and fitting in sealing engagement therewith when in threaded engagement with the valve body means when a shoulder on the through hole of the valve body means is in sealing engagement with a corresponding shoulder formed on the plug means, said second vent means further comprising a hole extending through the valve body means and into said plug means, said second vent means further comprising an anti-rotational solid plug in the hole extending through the valve body means and into the plug means, said anti-rotational solid plug changing phase from solid to liquid when the liquid in the storage tank reaches a predetermined critical temperature, at which time internal pressure in the storage tank causes the plug means to rotate until no longer in threaded engagement with the valve body means and is forced out of the valve body means, thus fully opening the valve and relieving excess pressure in the storage tank.

In a sixteenth preferred embodiment, there is provided in connection with the fifteenth preferred embodiment a pressure discharge mechanism in which the vent eutectic is one or more selected from the group consisting of $Bi_{58}Pb_{42}$, $In_{52}Sn_{48}$, $In_{74}Cd_{26}$, and $In_{50}Sn_{50}$.

In a seventeenth preferred embodiment, there is provided in connection with the fifteenth preferred embodiment a pressure discharge mechanism in which the solid anti-rotational plug is formed from one or more eutectic compositions selected from the group consisting of $Bi_{58}SN_{42}$, $Bi_{57}Sn_{42}Ag_1$, and $Sn_{51.2}Pb_{30.6}Cd_{18.2}$.

In an eighteenth preferred embodiment, there is provided in connection with the fifteenth preferred embodiment a pressure discharge mechanism in which a temperature differential between venting of the first vent means and the second vent means is adjustable so as to provide a specific time/temperature interval from safe to hazardous conditions for firefighters.

In a nineteenth preferred embodiment, there is provided in connection with the fifteenth preferred embodiment a pressure discharge mechanism in which a flange means is provided on the valve body means to aid in affixing the valve body means to the storage tank.

In a twentieth preferred embodiment, there is provided a pressure discharge mechanism for storage tanks comprising:
a. a circular valve body having an outwardly extending flange at a base of the body, said flange adapted to mount the valve on to a surface of a storage tank, said circular body having a round bore hole therein concentric with a longitudinal axis of the circular body, said circular bore hole having a larger diameter in an upper portion of the circular body than in a lower portion of the circular body, with a shoulder being formed in the bore hole where the diameter of the bore hole changes, an inside surface of the lower bore hole having threads formed therein, and one or more bore holes being formed in the circular body perpendicular to the longitudinal axis of the circular body;
b. a solid plug having a larger diameter at a top portion than at a lower portion thereof and being adapted to fit in sealing engagement with surfaces of the bore hole formed in the circular body, said plug having threads formed on a lower portion thereof which are adapted to operate in threaded engagement with threads on a lower portion of the bore hole in the circular body, a second bore hole formed in the solid plug which is in coincidence and alignment with said bore hole formed in an upper portion of the circular body; and
c. a solid anti-rotation eutectic pin inserted/disposed in the plug to prevent rotation of the plug relative to the circular valve body at safe temperatures, said anti-rotation eutectic pin operable to automatically change phase to a liquid at critical temperature, thereby permitting the plug to rotate upwardly and out of threaded engagement with the circular valve body whereby to open the valve,
wherein said plug has a small through hole extending from the tank wall with a first eutectic plug or pin in sealing engagement therein, said eutectic plug or pin being solid at safe temperature conditions but operable to change phase to a liquid at or near critical conditions whereby to release a small stream of liquid to the atmosphere to warn firefighters of imminent danger.

In a twenty first preferred embodiment, there is provided in connection with the first, fifteenth and twentieth preferred embodiments, a pressure discharge mechanism further comprising a eutectic solder material disposed between the plug and valve body/valve body means, said eutectic solder material being solid at normal operating temperatures but operable to change phase to a liquid at or near critical conditions, thereby acting as a lubricant in decreasing frictional resistance between the plug and valve body.

In a twenty second preferred embodiment, the pressure discharge mechanism of the twenty first embodiment is provided, wherein the eutectic solder material has a eutectic point between a eutectic point of the first vent means and the second vent means.

In a twenty third preferred embodiment, the pressure discharge mechanism of the twenty first embodiment is provided, wherein the eutectic solder material is comprised of one or more selected from the group consisting of $Bi_{58}Pb_{42}$, $In_{52}Sn_{48}$, $In_{74}Cd_{26}$, and $In_{50}Sn_{50}$.

In the case of storage tanks, the pressure discharge mechanism of the present invention vents the storage tank when the temperature exceeds a certain temperature above normal environmental temperature changes (universally −65 to 160° F. which is a conventional design criteria). In this case, the pressure discharge mechanism preferably vents or opens when the external temperature is at or above a temperature of 250° F. At this temperature, it is presumed that it is not natural stimuli increasing the temperature, and that a fire, electrical malfunction, undesired heat source or other unexpected heat generation is occurring. In this case, the internal pressure of the storage tank needs to be relieved and the contents at least partially discharged (for fuel oil, a piping system is preferred to transfer fuel to a safe location). The pressure discharge of the present invention valve can accomplish this objective.

The flange (11) serves as the support structure of the pressure discharge mechanism (1). It is used as the attachment means for holding the valve onto the storage tank. Additionally, it also supports the plug (25) via the thread joint (15, 19). The thread joint (15, 19), may be a conventional thread joint, or a multi-pitch thread joint, such as a guide release thread, which has the benefit of a faster release with less rotational force required. During normal operation, the plug (25) remains in a closed position, meaning that no contents can flow though it when the plug (25) and anti-rotation plugs or pins (33) are inserted (and remain at a temperature below their eutectic point).

Additionally, the plug (25) is prevented from rotating with respect to the valve body (9) via the thread joint (15, 19) when under internal forces and hoop pressure that may occur within the storage tank by the anti-rotation plugs or pins (33). The anti-rotational plug or pins (33) preferably has a high temperature melting point (approximately −280° F.+).

When the pressure discharge mechanism is exposed to this temperature, the anti-rotational plugs (33), will phase change from solid to liquid. This transformation in material property relieves the resistance to unthreading (rotation) by action exerted by the forces of the storage tank (weight of content—fuel and hoop pressures), thus allowing the solid plug (25) to rotate off flange (11) and effectively create an open valve.

The amount and size of the pressure discharge mechanisms needs to be determined by the size and type of closed vessel, i.e., whether it is a land storage tank or a tanker truck or an ammunition container. Additionally, different closed vessel contents require different sized pressure discharge mechanisms. The closed vessel contents can include fuel oil, gasoline, acids, liquefied gases, munitions, i.e., other closed vessels, etc. One skilled in the art will appreciate that the size and the contents of a particular closed vessel will determine the size and configuration of the optimal pressure discharge mechanism described herein.

As an added safety feature, the pressure discharge mechanism (1) has at least one solid plug (25), at least one small vent hole (27), and at least one small vent hole plug (31). As mentioned above, the small vent hole plug (31) is a means of sealing the small vent hole (27) until a temperature is reached between the 160° degrees for the operating temperature and the 280° F., the temperature at which the pressure discharge mechanism (1) is in the open position (via rotation of the solid plug (25)). The orientation of the small vent hole is optional (forward, downward, upward, angled, etc. . . . ). For example, small vent hole (27) can be oriented to discharge sideways, i.e., from the side of the tank.

In such a case, a partial release of certain storage tank fluids can be used to warn firefighters of hazardous conditions. In this case, a small release of a flammable fuel oil or gasoline provides a visual warning to a firefighter near a burning storage tank that an explosion of the contents is imminent. This visual warning will allow the firefighter to stay in a burning area as long as possible without it being too hazardous. The temperature differential of the eutectic points of the small vent hole plug (31) (as an example, 250° F.) versus the anti-rotation pins (33) (280° F.+), will afford the firefighter a sufficient time period to exit the burning area. This temperature differential between the small vent hole plug (31) and the anti-rotation pins (33) can be adjusted to define or create specific desired time/temperature intervals, so as to create safer conditions for firefighters and first responders.

In addition to the small vent hole plug (31) and anti-rotation plugs or pins (33), as illustrated in FIGS. 4 and 5, in a preferred embodiment, a solder material (35) formed from a eutectic composition is disposed between the plug (25) and the valve body (9). Preferably, the eutectic solder material (35), which may be comprised of one or more of $Bi_{58}Pb_{42}$, $In_{52}Sn_{48}$, $In_{74}Cd_{26}$, and $In_{50}Sn_{50}$, is disposed adjacent the threads (19), such that when the eutectic solder material reaches its eutectic point and changes phase (to a liquid), the eutectic solder material (35) acts as a lubricant with relation to the plug (25) and valve body (9). Accordingly, the eutectic solder material (35) is preferably comprised of a eutectic composition having a eutectic point higher than that of the vent plug (31), but lower than the anti-rotation plugs or pins (33).

For example, in a preferred embodiment, the small vent hole plug (31) has a eutectic point at or near 250° F., the solder material (35) has a eutectic point at or near 275° F., and the anti-rotation plugs or pins (33) have a eutectic point at or near 290° F. Thus, in operation, when the internal temperature of a storage tank rises beyond normal operating ranges and reaches 250° F., the small vent hole plug (31) is the first to change phase, providing a first warning of increasing temperature and pressure. Then, the solder material (35) changes phase when reaching a temperature of around 275° F., thereby releasing the plug (25) from tight engagement with the valve body (9) and lubricating the area therebetween. Finally, the anti-rotation plugs or pins (33) reach their eutectic point and change phase, thereby allowing the plug (25) to rotate via the threads (19), the rotation thereof aided by the lubrication provided by the liquid solder material (35).

Additionally, in its solid state, the solder material (joint) disposed between flange (11) and solid plug (25), as shown in FIG. 4, or thread joint (19), acts as a sealing means, such that the fluid and/or gas contained within the storage tank does not leak through the valve assembly. This threaded joint can be partial (as shown), or it can extend to the anti-rotation plugs or pins (33). In addition to the sealing properties provided by the solder material (35), the thread joint (19) itself, made of a material that does not change phase or distort at temperatures in the ranges given and thereby maintains full mechanical strength to maintain structural integrity of the closed vessel, as the solder material (35) is not generally strong enough on its own (without the threads) to maintain the plug in a fixed position under pressure or under normal operating conditions.

To further improve the holding strength partially provided by the thread joint, in one embodiment, the anti-rotation plugs or pins (33) are provided to resist the rotational forces exerted by the pressure loads on the solid plug (25). Moreover, in this embodiment, the anti-rotation plugs or pins (33), which have a higher eutectic point than the solder material (35), ensure that the solder material (35) reaches a temperature sufficient to fully melt same (i.e., change phase from solid to liquid) prior to release of the plug (by the phase change of the anti-rotation eutectic plugs or pins (33). This important property/effect of the present invention ensures that not only is the thread joint lubricated prior to release of anti-rotational forces on the plug (25), but that the solid plug (25) is not canted until it is ready to unthread itself.

Another safety feature of the pressure discharge mechanism (1) is that the flange (11) can have piping disposed over it or in communication therewith such that when the solid plug (25) rotates off flange (11), the piping can then divert the storage tank contents to a safe location. As an example, fuel oil can be diverted to an "open" pool where there can be a controlled fire without the possibility of an explosion. Another example would be a safe location where there is no fire and the fuel can be recovered. In this case, the environmental clean-up cost could be greatly impacted (cost savings).

As far as a vehicle, a hose (not shown) can be attached to at least control the total amount of discharge. An example would be to attach a fire hose (usually carried by firefighters) and transfer the oil/gasoline to a receiving area away from the fire. The diversion of fuels is important for recovery potentials and also to minimize contamination. If the fuel can be recovered, it has a high dollar value versus an exploding storage tank which has no recovery value.

In one embodiment, the present invention provides a valve system that initially warns firefighters of the fuel storage tank temperature. This feedback provides a field/tank temperature reading via the valve which, when safe to be near, has no indications of being open. As the temperature increases and approaches the critical point, valve 1 automatically discharges a small stream of fuel to warn firefighters (see FIG. 1). This fuel discharge can be either a controlled "squirting" of the fuel or an ignited fuel as a controlled fire ball to provide firefighters a visual indication that it is too dangerous to approach the storage tank.

After this warning signal, the valve system then automatically goes into a discharge or open position mode to reduce the internal pressure in the storage tank. This mode disposes of the fuel from the storage tank, thus reducing the potential of a tank rupture which may be more dangerous than a fuel fire.

In one embodiment, the valve system of the present invention achieves the objects of the invention by providing: a mechanical thread joint lock valve (15, 19), flange (11), and solid plug (25); automatically providing a controlled warning fuel disposal via a small vent hole (27); an anti-rotation feature using an anti-rotation eutectic plug or pin (33); and fuel disposal at a specific temperature.

The Pressure Discharge Mechanism of the Present Invention Employed in Munitions

As discussed above, the pressure discharge mechanism of the present invention may be utilized on any closed vessel. However, for clarity and without limiting the disclosure in any way, the following section discusses the application of the pressure discharge mechanism of the present invention for munitions casings.

In one embodiment, the munition contains a pressure release mechanism of the present invention and the container in which the munition is stored also contains a pressure release mechanism of the present invention.

The design of munitions casings does not typically allow for the separation of the body after assembly. In one embodiment, the present invention provides a temperature safe munition primarily for use in military applications, but not limited thereto, with potential applications in civilian commercial (such as, common home use propane tanks) and aerospace applications. In particular, the present temperature safe munition functions as intended under normal operating environments. However, when the munition of the present invention is exposed to high temperatures above normal operating temperatures it reduces its high order explosion capability, and is transformed into a safe, low order reaction with significantly less reactive potential.

More specifically, a munition, such as, for example, an artillery shell, a bomblet, or a grenade can be rendered safe instead of going high order, when it is exposed to high temperatures, utilizing the pressure discharge mechanism of the present invention.

Upon exposure to high temperatures, the munition of the present invention does not go high order (a lethal level 1 detonation), but rather goes low order (a non-lethal level 5 reaction, where the energetics simply combust. The munition of the present invention goes into a nonfunctional (or safe) mode, so that firefighting efforts, or demilitarizing procedures can be made without the hazard of the munition detonating. The munition of the present invention goes into the non-functional or safe mode by simply opening, wherein the energetics may be released or removed, in the case of a demilitarizing procedure, or combust, in the case of a fire. In one embodiment, the energetics are contained within a secondary container, such as a bladder, inside the casing of the munition. The secondary container may facilitate the removal of the energetics in demilitarizing procedures.

The high temperature exposure may be intentional, such as for example, in a demilitarization procedure. Alternatively, the high temperature exposure may be accidental, such as, for example, in the case of a fire.

In one embodiment, the present invention provides a temperature safe munition comprising two members that are secured together by a threaded joint, thereby forming a closed vessel. The user is unaware of the threaded joint, and the threaded joint allows for the separation of the two members when the munition is exposed to a temperature at or in excess of a predetermined critical temperature.

In one embodiment, heating the munition at or in excess of a predetermined critical temperature causes the two members to separate along the threaded joint. In one embodiment, the threaded joint is coated with a compound that seals the threaded joint during normal operational conditions, but allows the threaded joint to unscrew when the munition is heated to exposed to a temperature at or in excess of a predetermined critical temperature. In one embodiment, the compound is a eutectic solder composition.

The eutectic composition is generally equivalent in strength to a solder joint with the characteristic that the eutectic composition remains solid until a predetermined critical temperature. Upon reaching this temperature, the added latent heat or energy converts the eutectic composition to a liquid. This specific phase change temperature occurs in between the operating temperature of the munition and the detonation temperature of the energetics.

In one embodiment, the predetermined critical temperature is a temperature that is less than the thermal detonation temperature of the energetic within the munition. In one embodiment, the predetermined critical temperature is about 160° F. In one embodiment, the predetermined critical temperature is less than about 300° F. In one embodiment, the predetermined critical temperature corresponds to the eutectic point of the eutectic solder composition coated on the threaded joint.

Another feature of the present munitions design is that the threaded joint retains hoop pressure (or hoop stress along the circumferential direction). The hoop pressure is developed from the thermal effects of elevating the temperature of the munition body and the energetics contained within it, above the operating temperature. In a one embodiment, the threaded joint concurrently acts as a strength member to retain the forces of the energetics detonation, and also as the means for separating (or dismantling) the two members of the munition of the present invention body.

In one embodiment, the eutectic composition is a thin coating that coats the threads of the threaded joint. In one embodiment, the eutectic coating is "wicked" into the threads of the threaded joint as the threads are heated to a temperature above the melting point of the eutectic composition.

The eutectic composition can alternatively be deposited by sputtering, dual source evaporation, or electroplating, on the threads. It also can be formed by diffusion reactions of pure materials and subsequently melting of the eutectic composition. The munition body members can be plated with a material such as tin (or another alloy which is compatible with the munition body members and the eutectic composition) so that it can be "soldered" into the threaded joint (like one would "solder" copper pipes in a home).

The eutectic composition can be comprised of a material, or alloy, such as an alloy formed from a mixture of bismuth (58%) and tin (42%), which gives a eutectic material property of phase change at 280° F.

The bonding of the eutectic composition is able to produce a hermetically sealed munition body, in order to protect the energetics contained within the munition body, and to prevent the munition body members from unscrewing during the detonation of the munition under normal operating temperatures.

In addition, the eutectic composition provides a high bonding strength, large fabrication yield, and a good reliability to the manufacture of the munition.

The thickness of the eutectic composition coating on the threads can range between approximately 0.010 to 0.020 inches. It should however be clear that the exact thickness of the eutectic composition may vary with the intended application.

It should also be clear that an important aspect of the threaded joint is that the metallic threads are in close engagement to each other and are made of a material sufficiently strong to maintain structural integrity of the closed vessel. The threads are restrained by the eutectic composition from rotating (twisting, unscrewing, or spinning) and causing the munition body to separate into its two constituent segments during normal operating temperatures and also fully sealed by the eutectic material. However, the strength is maintained by the threads.

Furthermore, the threaded joint does in fact allow the two constituent segments of the munition body to rotate or unscrew under elevated temperatures. More specifically, the unscrewing generally coincides with the munition body reaching or exceeding the eutectic temperature (or eutectic phase change temperature).

To further facilitate the separation of the munition body, the threaded joint can be made with the use of a multiple lead thread. In this case, a single lead thread or conventional thread has the potential to tip or lean in a specific direction on the thread pattern and thus requires additional forces to unthread the threaded joint. Similarly, a two-lead thread (or a thread with leads at 180 degrees apart) could pivot about the two opposing thread surfaces and thus cause potential added resistance for the unthreading of the joint. Additionally, a three or more lead thread would pick up on three or more points on the thread pattern and this would hold the thread orientation so that the least amount of resistance for the threaded joint would be realized. Additionally, the threads may be angled to facilitate unscrewing when the eutectic is in liquid phase.

While the pressure discharge mechanism of the present invention may be utilized on any munitions casing. However, for clarity and without limiting the disclosure in any way, the following section discusses the application of the pressure discharge mechanism of the present invention use in fragmentation grenades.

Figure 8:
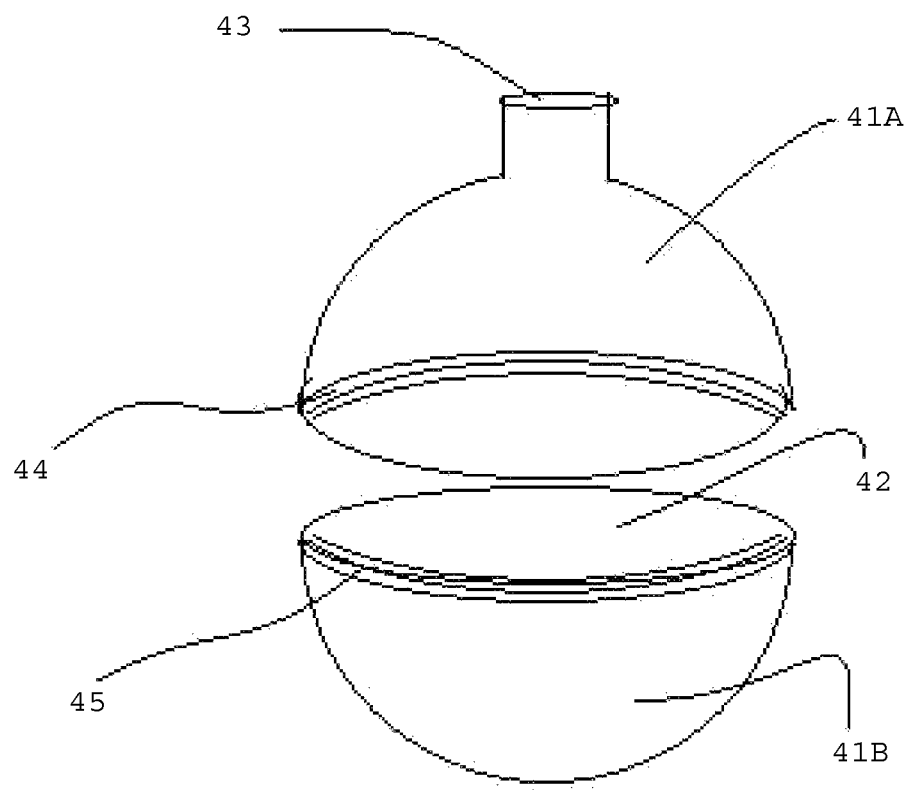
FIG. 8 is a perspective view of a typical munition, in this instance a hand grenade with one embodiment of the present invention illustrating two halves (41A, 41B) of the munition closed vessel held together by a threaded joint (44, 45) made of a suitably strong metal and sealed with a eutectic solder that when sealed contains energetic in its internal chamber (42) capable of deployment through its fuse hole (43), but when heated to a predetermined critical temperature lower than the critical temperature of the energetic, melts and acts as a lubricant allowing the threaded joint to unscrew releasing the energetics.

FIG. 8 illustrates a hand grenade body (or grenade) (41A and 41B) that incorporates a threaded joint (44,45) according to the present invention. As further illustrated, the grenade body includes two generally hemispherical, cup-shaped members (41A, 41B), that are secured together by means of the threaded joint (44,45). The threaded joint is transparent to the user, but it allows for the separation of the two members (41A, 41B) when the grenade is exposed to temperatures that fall above its intended temperature range of normal operation.

The threaded joint (44,45) presents an improvement over the conventional grenade design in that it provides the grenade with the ability to separate the grenade body members (41A, 41B) into its two constituent segments in order to support improvements in cook-off capabilities. In a preferred embodiment, the threaded joint (44,45) concurrently acts as a strength member to retain the forces of the energetics detonation because it has a metallic thread engagement, and also as the means for separating (or dismantling) the grenade body members (41A,41B) under cook-off conditions (or exposure to temperatures above the normal use and operating range).

As used herein, a cook-off condition can be either a fast cook-off or a slow cook-of. Fast cook-off refers to the initiation of a unit of ammunition or other energetic store in the event of a flash fire such as a fuel fire. Packaging munitions or other such explosives according to the present invention will prevent the ammunition or other energetic material from reaching an auto-ignition temperature.

Slow cook-off refers to the initiation of a unit of ammunition or other energetic material in the event of a slower but more sustained thermal event. The insulating material of the present invention is also a good thermal insulator. So packaging munitions or other energetic material according to the present invention will prevent the ammunition or other energetic material from reaching an auto-ignition temperature because insulation alone cannot stop the munition from reaching the auto-ignition temperature.

The strength of the threaded joint (44,45) is necessary to hold the grenade body under normal operating temperatures, so that the grenade acts as a pressure vessel for the energetics detonation. To make this feature transparent, a novel thread design has been implemented, as it will be described later in more detail. One with ordinary skill in the art, however, would readily appreciate that the novel thread design can be employed with any munition.

In the case of grenades, such thread design is necessary to match the performance characteristics of the grenade body, especially the fragmentation pattern. In this embodiment, the threaded joint (44,45) strength can be matched to the mechanical properties of a welded joint by the amount of threads used for the engagement of the thread joint. The amount of thread engagement can be made to match the strength of the current welded grenade body.

Another feature of the present grenade design is that the threaded joint (44,45) retains the hoop pressure (or hoop stress along the circumferential direction). The hoop pressure is developed from the thermal effects of elevating the temperature of the grenade body and the energetics contained within it, above the operating temperature.

For example, the grenade body can become separated when the grenade is exposed to a high temperature, such as 160° F., which is less than the energetics' thermal detonation temperature that exceeds approximately 300° F. To attain this result, a eutectic alloy bond (or material) is added to the threaded joint (44,45).

As stated earlier, the eutectic bond is equivalent to a solder joint but the bonding material remains a solid until a specific predetermined temperature (hereinafter also referred to as the eutectic temperature) is reached. In this particular exemplary embodiment, such specific temperature is, for example approximately 280° F. Upon reaching this specific temperature, with the additional energy from the temperature increase source, such as fire, the eutectic composition changes phase, from a solid to a liquid.

As a result of the phase change, the grenade body members (41A, 41B) unscrew at the threaded joint (44,45), with the eutectic composition acting as a lubricant to facilitate the unthreading (or twisting) action. Consequently, the specific phase change temperature must be selected to be in between the operating temperature of the grenade and the temperature of the energetics detonation, in order to prevent the grenade from reaching the energetics detonation temperature.

The eutectic composition is a thin coating that coats the threads (44,45) of the threaded joint, similar to a solder on a copper pipe.

More specifically, the thin coating of the eutectic composition is "wicked" into the threads (44,45) of the threaded joint as the threads are heated to a temperature above the melting point of the eutectic composition.

The eutectic material is also referred to as eutectic bonding or eutectic soldering, and is comprised of eutectic metals or alloys that transform directly from solid to liquid state, or vice versa, at a specific temperature, referred to herein as the eutectic temperature, without passing a two-phase equilibrium, i.e., liquid and solid state.

The eutectic composition can alternatively be deposited by sputtering, dual source evaporation, or electroplating, on the threads. It also can be formed by diffusion reactions of pure materials and subsequently melting of the eutectic composition. The grenade body members (41A, 41B) can be plated with a material such as tin (or another alloy which is compatible with the grenade body members and the eutectic composition) so that it can be "soldered" into the threaded joint (like one would "solder" copper pipes in a home).

The eutectic composition can be comprised of a material, or alloy, such as an alloy formed from a mixture of bismuth (58%) and tin (42%), which gives a eutectic material property of phase change at 280° F.

The bonding of the eutectic composition is able to produce a hermetically sealed grenade body, in order to protect the energetics contained within the grenade body (42), and to prevent the grenade body members (41A, 41B) from unscrewing during the detonation of the grenade under normal operating temperatures.

In addition, the eutectic composition provides a high bonding strength, large fabrication yield, and a good reliability to the manufacture of the grenade.

In this exemplary embodiment the thickness of the eutectic material coating on the threads can range between approximately 0.010 to 0.020 inches. It should however be clear that the exact thickness of the eutectic material may vary with the intended application.

It should also be clear that an important aspect of the threaded joint is that the metallic threads (44, 45) are in close engagement to each other. The threads are restrained by the eutectic from rotating (twisting, unscrewing, or spinning) and causing the grenade body to separate into its two constituent segments during normal operating temperatures.

Furthermore, the novel eutectic threaded joint does in fact allow the two constituent segments of the grenade body to rotate or unscrew themselves under elevated temperatures. More specifically, the unscrewing generally coincides with the grenade body reaching or exceeding the eutectic temperature (or eutectic phase change temperature).

In the example of the M67 grenade, the eutectic temperature should be higher than the operating temperature of the grenade (i.e., between approximately −60° F. and 160° F.) or above approximately 160° F. but lower than the temperature of the energetic material self detonation temperature. In this case, the combination of all of the grenade energetics, including Comp B, RDX, Lead Styphnate and Lead Azide, self detonate at temperatures over 300° F.

As a result, the eutectic composition is set to phase change at a temperature of approximately 280° F. or between the operating and self detonation temperatures. More specifically, important characteristics of the eutectic composition are as follows:

1. The eutectic composition is solid at temperatures below 280° F.
2. The solid eutectic composition does not allow the grenade body to rotate or "un-spin" into two separate members unless desired (i.e., at a temperature over 280° F.). The mechanical strength of the eutectic composition in combination with the metallic strength of the threads themselves, allows the threaded joint to securely bond or hold the two grenade members together. The added strength of the eutectic composition is for the rotational forces for the unspinning of the threaded joint. The forces needed for the fragmentation or detonation are maintained by the threaded joint engagement.
3. Upon reaching the phase change temperature, the eutectic composition changes phase to a liquid form, and serves to lubricate the members of the grenade body, thus assisting in the separation process.

The forces necessary to un-spin the grenade body emanate from the eutectic composition from the energetic material from within the grenade itself. In an exemplary preferred embodiment, the material of choice of the energetics is the phase changeable energetic material such as the Compo B or similar energetics thereto. As used herein, a phase changeable energetic material converts from solid to liquid such as "Melt-Pour" energetics.

A "Melt-Pour" energetic is solid in temperatures of 180° F. or below and a liquid above this temperature. The forces necessary are the effects of phase changing the Compo B from solid to liquid (thermal expansion effects) or "hoop" pressure are increased because it is in a pressure vessel, i.e., the grenade body. As the temperature increases above the melting point of 180° F. for the Comp B, the internal "hoop" within the grenade body increases until the eutectic coated threads reach a melting point (approximately 280° F.).

The energetics (or energetic material) fills, at least in part, the grenade body. The energetic material is poured into the assembled grenade body at a temperature slightly over 180° F. where it is a liquid and then solidifies as the temperature is reduced.

The grenade body whether welded or threaded with a eutectic bond has the ability to accept "Melt-Pour" energetics without separating because the eutectic at the threaded joint has the ability to withstand temperatures up to 280° F. without undergoing a phase change.

In the embodiment described herein, where the Comp B is used as the energetic material, after the M67 grenade is assembled, it normally does not undergo a re-melting condition because the operating temperatures range between approximately −60° F. and +160° F., and to re-melt the Comp B material, a temperature of over 180° F. would be necessary.

Using this phenomenon, the eutectic point of the threaded joint of the grenade body is designed to be a predefined number of degrees above the 280° F., which is above the phase change temperature of the Comp B energetic material 250. As the temperature is increased towards the eutectic melting point of approximately 280° F., an internal pressure is created within the grenade body. At the eutectic phase change temperature, the eutectic composition converts to a liquid and the pressure of the energetic material forces the untwisting of the grenade body.

The thread employed is a three or more lead thread that aides in the alignment of the threaded joint so as not to bind by pivoting motions as experienced in a single or dual thread configuration. The three or more lead thread is important to this application because any binding could be detrimental if the threads do not disengage as needed.

It should be understood that other modifications may be made to the present design, such as but not limited to, the angle of the threads with respect to each other, without departing from the spirit and scope of the invention. For example, the present invention may be applicable to any container that contains an energetic or combustible material, or a sensitive material that is affected by high temperatures.

It will also be appreciated by one of skill in the art that all eutectic compositions cited herein have specific phase change temperature properties and that the specific eutectic material chosen, including others not specifically cited herein or hereafter developed, may be chosen for their specific eutectic phase change temperature and other properties such as lubricating ability.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

What is claimed is:

1. A pressure discharge mechanism comprising:
  a. a valve body having an outer or discharge end and a lower or entry end which is in contact with a closed vessel, the valve body having at least one through hole therein adapted to mate and communicate with a corresponding through hole in a wall of the closed vessel;
  b. an at least one first vent which automatically provides a partial release of contents within said closed vessel at a first predetermined temperature lower than critical combustion and/or explosive temperatures of said closed vessel contents;
  c. an at least one second vent which automatically provides a second and greater release of said closed vessel contents through the at least one through hole in the valve body when the contents in the closed vessel reaches a second predetermined temperature higher than the first predetermined temperature but still lower than critical combustion and/or explosive temperatures of the contents of the closed vessel; and
  d. a solid plug adapted to be connected in threaded engagement with said valve body, whereby to close the at least one through hole therein until the temperature of contents of the closed vessel reaches a critical temperature, said at least one first vent further comprising a vent hole extending through said plug to facilitate a partial release of contents from the closed vessel to the atmosphere, the vent hole in the first vent being provided with a plug formed of a first eutectic composition which seals the vent hole until a first predetermined temperature is reached, said first eutectic composition changing from a solid to a liquid over a predetermined narrow temperature range, thereby melting the solid plug from the vent hole which results in a partial release of liquids from said first vent, said valve body having a through hole which has a smaller diameter in contact with the closed vessel than at the discharge end of the pressure valve, with a shoulder being formed where the diameter of the through hole becomes larger, the smaller discharge hole in the valve body being threaded, said plug conforming in size and shape to the round through hole in the valve body, and fitting in sealing engagement therewith when in threaded engagement with the valve body when a shoulder on the through hole of the valve body is in sealing engagement with a corresponding shoulder formed on the plug, said at least one second vent further comprising a hole extending through the valve body and into said plug, said second vent further comprising an anti-rotational solid plug formed of a second eutectic composition in the hole extending through the valve body and into the plug, said anti-rotational solid plug changing phase from solid to liquid when the contents in the closed vessel reaches a predetermined critical temperature, at which time internal pressure in the closed vessel causes the plug to rotate until no longer in threaded engagement with the valve body and is forced out of the valve body, thus fully opening the valve and relieving excess pressure in the closed vessel.

2. The pressure discharge mechanism of claim 1, wherein the first eutectic composition is selected from the group consisting of $Bi_{58}Pb_{42}$, $In_{52}Sn_{48}$, $In_{74}Cd_{26}$, and $In_{50}Sn_{50}$.

3. The pressure discharge mechanism of claim 1, wherein the second eutectic composition selected from the group consisting of $Bi_{58}SN_{42}$, $Bi_{57}Sn_{42}Ag_1$ and $Sn_{51.2}PB_{30.6}Cd_{18.2}$.

4. The pressure discharge mechanism of claim 1, further comprising a eutectic solder material disposed between the plug and the valve body at the threaded engagement, said eutectic solder material having a eutectic point between the first and second eutectic compositions.

5. The pressure discharge mechanism of claim 1, wherein a flange is provided on the valve body to aid in affixing the valve body to the closed vessel.

6. The pressure discharge mechanism of claim 1, wherein the partial release of contents within said closed vessel through the at least one first vent provides a perceptible signal.

7. A pressure discharge mechanism for closed vessels comprising:
   a. a valve body having an outwardly extending flange at a base of the body, said flange adapted to mount the valve on to a surface of a closed vessel, said valve body having a bore hole therein concentric with a longitudinal axis of the valve body, said bore hole having a larger diameter in an upper portion of the valve body than in a lower portion of the valve body, with a shoulder being formed in the bore hole where the diameter of the bore hole changes, an inside surface of the lower bore hole having threads formed therein, and one or more bore holes being formed in the upper portion of the valve body perpendicular to the longitudinal axis of the valve body;
   b. a solid plug having a larger diameter at a top portion than at a lower portion and being adapted to fit in sealing engagement with surfaces of the bore hole formed in the valve body, said plug having threads formed on a lower portion thereof which are adapted to operate in threaded engagement with threads on a lower portion of the bore hole in the valve body, and an at least one second bore hole formed in the solid plug which is in coincidence and alignment with said one or more bore holes formed in an upper portion of the valve body; and
   c. an at least one solid anti-rotation pin inserted in the at least one second bore hole and extending into the one or more bore holes formed in the upper portion of the valve body so as to prevent rotation of the plug at safe temperatures, said anti-rotation pin automatically changing phase to a liquid at critical temperature to release the plug and permit the plug to rotate upwardly and out of threaded engagement with the valve body whereby to open the valve; said plug having an at least one small through hole extending from the tank wall with an at least one first plug or pin in sealing engagement therein, said plug or pin being solid at safe temperature conditions but changing phase to a liquid at a predetermined temperature lower than critical combustion and/or explosive temperatures of said contents in the closed vessel.

8. A temperature safe closed vessel comprising two members, which are secured together by means of a threaded joint to form one pressure tight closed vessel, wherein the threaded joint consists of metallic threads on each of the two members, wherein the metallic threads are coated with a eutectic composition and the metallic threads are in close engagement with each other, forming a seal with no gaps or channels between the two members; energetics or hazardous material within said pressure tight closed vessel; wherein said energetics or hazardous material reaches a critical stage at a predetermined temperature above normal operating temperature; wherein the eutectic composition coating said threaded joint and said eutectic composition remains in a solid state when the pressure tight closed vessel is below a temperature that is equal to a predetermined eutectic melting temperature of the eutectic composition, but liquid when the pressure tight closed vessel is above a temperature greater than the predetermined eutectic melting temperature of the eutectic composition, wherein the solid eutectic composition prevents the two members from separating; the energetics or hazardous material causing pressure build up within the pressure tight closed vessel when the temperature of the pressure tight closed vessel is increased above normal operating temperature, resulting in an internal pressure that causes the threaded joint to become unthreaded and the at least two members to separate.

9. The temperature safe closed vessel according to claim 8, wherein the critical stage temperature for the energetics or hazardous material or other closed vessels is below a temperature at which the energetics or hazardous material self-detonates or combusts.

10. The temperature safe closed vessel according to claim 8, wherein the eutectic composition phase changes at a temperature below a temperature at which the energetics or hazardous material self-detonates or combusts.

11. The temperature safe closed vessel according to claim 10, wherein the temperature at which the energetics or hazardous material self-detonates or combusts is approximately 280° F.

12. The temperature safe closed vessel according to claim 10, wherein the temperature at which the energetics or hazardous material self-detonates or combusts exceeds approximately 300° F.

13. The temperature safe closed vessel according to claim 8 wherein the vessel is a grenade body.

14. The temperature safe closed vessel according to claim 8 wherein the threaded joint includes multiple thread leads that aid the threaded joint to unscrew.

15. The temperature safe closed vessel according to claim 14, wherein the threaded joint includes at least three thread leads that create points of contact for a plane, and thus minimize canting of the two members as they unscrew.

16. A temperature safe grenade comprising at least two members that are secured together by means of a threaded joint, wherein the threaded joint consists of metallic threads on each of the two members, wherein the metallic threads are coated with a eutectic composition and the metallic threads are in close engagement with each other, forming a seal with no gaps or channels between the two members; a phase changeable energetic material contained within the two members; wherein the energetic material reaches a critical stage at a predetermined temperature; wherein the eutectic composition coats the threaded joint so that the eutectic composition remains in a solid state when the grenade is in a normal operating environment; wherein upon exposure to an elevated temperature that is at least equal to a predetermined eutectic melting temperature of the eutectic composition, the energetic material causes pressure build up within the grenade via a phase change from solid to liquid and to result in an internal pressure that causes the threaded joint to become unscrew and the at least two members to separate.

17. The temperature safe grenade according to claim 16, wherein the elevated temperature for the energetic material is below the temperature at which the energetics or hazardous material self-detonates or combusts.

18. The temperature safe grenade according to claim 16, wherein the at least two members are held together by the threaded joint and a bond resulting from the eutectic composition, wherein the bond pressure seals the threaded joint and has mechanical strength properties that prevents the threaded joint from unscrewing under normal operating conditions.

19. The temperature safe grenade according to claim 16, wherein the at least two members are held together by the threaded joint and a bond resulting from the eutectic composition, wherein the bond seals the threaded joint and has mechanical strength properties that prevents the threaded joint from unscrewing during detonation.

20. The temperature safe grenade according to claim 16, wherein the eutectic composition phase changes at a temperature below a temperature at which the energetic material self-detonates.

21. The temperature safe grenade according to claim 20, wherein the temperature at which the energetic material self-detonates is approximately 280° F.

22. The temperature safe grenade according to claim 20, wherein the temperature at which the energetic material self-detonates exceeds approximately 300° F.

23. The temperature safe grenade according to claim 16, wherein the two members are generally cup-shaped.

24. The temperature safe grenade according to claim 16, wherein the threaded joint includes multiple thread leads that aid the threaded joint to unscrew.

25. The temperature safe grenade according to claim 24, wherein the threaded joint includes at least three thread leads that create points of contact for a plane, and thus minimizes any canting of the two members as they unscrew.

\* \* \* \* \*